United States Patent
Alvine et al.

(10) Patent No.: US 10,725,208 B2
(45) Date of Patent: Jul. 28, 2020

(54) TWO DIMENSIONAL META-MATERIAL WINDOWS

(71) Applicant: Battelle Memorial Institute, Richland, WA (US)

(72) Inventors: Kyle J. Alvine, Richland, WA (US); Bruce E. Bernacki, Kennewick, WA (US)

(73) Assignee: Battelle Memorial Institute, Richland, WA (US)

(*) Notice: Subject to any disclaimer, the term of this patent is extended or adjusted under 35 U.S.C. 154(b) by 197 days.

(21) Appl. No.: 13/923,205

(22) Filed: Jun. 20, 2013

(65) Prior Publication Data
US 2013/0342898 A1  Dec. 26, 2013

Related U.S. Application Data

(60) Provisional application No. 61/662,275, filed on Jun. 20, 2012.

(51) Int. Cl.
G02B 1/10 (2015.01)
G02B 1/14 (2015.01)
(Continued)

(52) U.S. Cl.
CPC .......... *G02B 1/10* (2013.01); *E06B 9/24* (2013.01); *E06B 9/264* (2013.01); *G02B 1/002* (2013.01);
(Continued)

(58) Field of Classification Search
CPC .... E06B 9/24; E06B 9/264; E06B 2009/2417; E06B 2009/2643; G02B 1/002;
(Continued)

(56) References Cited

U.S. PATENT DOCUMENTS 5,183,700 A * 2/1993 Austin ............. C03C 17/3435
                                                    359/359
5,229,339 A   7/1993 Pujari et al.
(Continued)

FOREIGN PATENT DOCUMENTS

EP   1 241 490 A2   9/2002
JP   HEI 07-043530   5/1995
(Continued)

OTHER PUBLICATIONS

Korgel, B., "Composite for smarter windows," *Nature Magazine*, Aug. 15, 2013, 500:278-279, 2 pages.
(Continued)

*Primary Examiner* — William R Alexander
*Assistant Examiner* — Ephrem Z Mebrahtu
(74) *Attorney, Agent, or Firm* — Klarquist Sparkman, LLP

(57) ABSTRACT

Conductive nanoshells are oriented so as to redirect incident radiation as a function of wavelength. Nanoshells can be formed on templates such as nanospheres or gratings and embedded in an elastomeric layer. In some examples, conductive nanoshells are coupled to a layer that is configured to unbuckle and buckle as a function of temperature, so that radiation in one or more wavelength ranges is directed differently at different temperatures. Building windows can include such layers to that infrared radiation is reflected on warm days and directed into a building on cool days. Such layers can also direct incident visible radiation to a room ceiling so as to enhance interior lighting.

27 Claims, 11 Drawing Sheets

(51) Int. Cl.
  *G02B 1/00* (2006.01)
  *E06B 9/264* (2006.01)
  *E06B 9/24* (2006.01)
(52) U.S. Cl.
  CPC ............ *G02B 1/005* (2013.01); *G02B 1/007* (2013.01); *G02B 1/14* (2015.01); *E06B 2009/2417* (2013.01); *E06B 2009/2643* (2013.01)
(58) Field of Classification Search
  CPC . G02B 1/005; G02B 1/10; G02B 5/30; G02B 5/3008; G02B 5/3025; G02B 5/3033; G02B 5/3041; G02B 5/305; G02B 5/3058; G02B 5/3066; G02F 1/133528; G02F 1/133531; G02F 1/133533; G02F 1/133536; G02F 1/133545; G02F 1/133548; G02F 1/13355
  USPC ......... 359/350–360, 485.05, 487.03, 487.04, 359/566, 569, 570, 572, 573, 574, 575, 359/576, 591–598
  See application file for complete search history.

(56) References Cited

U.S. PATENT DOCUMENTS

| | | | |
|---|---|---|---|
| 6,288,840 | B1 | 9/2001 | Perkins et al. |
| 6,979,704 | B1 | 12/2005 | Mayer et al. |
| 7,283,571 | B2 | 10/2007 | Wang et al. |
| 7,683,982 | B2 | 3/2010 | Cho |
| 8,187,887 | B2 | 5/2012 | Swager et al. |
| 8,274,727 | B1* | 9/2012 | Yap ........................ G02B 5/128 235/454 |
| 8,512,588 | B2 | 8/2013 | Tringe et al. |
| 8,599,486 | B2 | 12/2013 | Najiminaini et al. |
| 8,905,559 | B2 | 12/2014 | Kawauchi et al. |
| 8,927,056 | B2 | 1/2015 | Yamaki et al. |
| 9,580,793 | B2 | 2/2017 | Alvine et al. |
| 2004/0047638 | A1 | 3/2004 | Wang et al. |
| 2004/0125449 | A1* | 7/2004 | Sales ................... G02B 5/3058 359/485.05 |
| 2005/0078374 | A1* | 4/2005 | Taira ................... G02B 5/1814 359/569 |
| 2006/0115536 | A1 | 6/2006 | Yacaman et al. |
| 2007/0217008 | A1* | 9/2007 | Wang ................... G02B 5/1809 359/485.05 |
| 2008/0087973 | A1 | 4/2008 | Wang et al. |
| 2008/0093557 | A1 | 4/2008 | Cooke et al. |
| 2009/0253227 | A1 | 10/2009 | Defries et al. |
| 2010/0035039 | A1 | 2/2010 | Jing et al. |
| 2010/0134719 | A1* | 6/2010 | Johns ..................... C23C 14/02 349/62 |
| 2010/0177380 | A1* | 7/2010 | Nagahama ............... B32B 3/30 359/359 |
| 2011/0003279 | A1 | 1/2011 | Patel |
| 2011/0012086 | A1 | 1/2011 | Tsakalakos et al. |
| 2011/0017431 | A1 | 1/2011 | Yang et al. |
| 2011/0081724 | A1 | 4/2011 | Swager et al. |
| 2011/0107569 | A1 | 5/2011 | Wang et al. |
| 2011/0117202 | A1 | 5/2011 | Bourke, Jr. et al. |
| 2011/0019283 | A1 | 6/2011 | Steenblik et al. |
| 2011/0223480 | A1 | 9/2011 | Wee et al. |
| 2011/0310487 | A1* | 12/2011 | Nagahama ............... E06B 9/24 359/599 |
| 2011/0312080 | A1 | 12/2011 | Hatton et al. |
| 2012/0097204 | A1 | 4/2012 | Yu et al. |
| 2012/0113502 | A1 | 5/2012 | Suh et al. |
| 2012/0178877 | A1 | 7/2012 | Rathje et al. |
| 2013/0045877 | A1 | 2/2013 | Yap et al. |
| 2013/0225760 | A1 | 8/2013 | Jing et al. |
| 2013/0232587 | A1 | 9/2013 | Boday et al. |
| 2013/0342898 | A1 | 12/2013 | Alvine et al. |
| 2014/0177039 | A1 | 6/2014 | Li et al. |
| 2016/0033685 | A1 | 2/2016 | Alvine et al. |
| 2016/0231435 | A1 | 8/2016 | Alvine et al. |

FOREIGN PATENT DOCUMENTS

| | | |
|---|---|---|
| JP | 2001-074935 | 3/2001 |
| JP | 2008-083656 | 4/2008 |
| JP | 2008-203848 | 9/2008 |
| JP | 2009-046742 | 3/2009 |
| JP | 2009-053489 | 3/2009 |
| JP | 2010-061124 | 3/2010 |
| JP | 2010-085917 | 4/2010 |
| JP | 2010-117634 | 5/2010 |
| JP | 2010-217746 | 9/2010 |
| JP | 2011-070219 | 4/2011 |
| WO | WO 2010-099805 | 9/2010 |

OTHER PUBLICATIONS

Llordes, A., et al., "Tunable near-infrared and visible-light transmittance in nanocrystal-in-glass composites," Nature Magazine, Aug. 15, 2013, 500:323-326, 4 pages.

Invitation to Pay Additional Fees and Annex Form from International Application No. PCT/US2013/046778, dated Oct. 8, 2013, 6 pages.

International Search Report from International Application No. PCT/US2013/046778, dated Dec. 16, 2013, 5 pages.

Written Opinion from International Application No. PCT/US2013/046778, dated Dec. 16, 2013, 8 pages.

Mirin and Halas, "Light-Bending Nanoparticles," Nano. Lett. 9:1255-1259 (2009).

Notice of Reasons for Rejection from Japanese Application No. 2015-518575, dated Dec. 2, 2016, 14 pages (with English translation).

Office Action for related EP App. No. 13736685.2, dated Mar. 28, 2019, 5 pages.

Harvey, "Replication techniques for micro-optics," Proc. of SPIE, 3099:76-82, (Sep. 1997).

Tsuji et al., "Self-assembly of poly (N-isopropylacrylamide)-carrying microspheres into two-dimensional colloidal arrays," Langmuir, 21:2434-2437 (Feb. 2005).

Alvine et al., "Optical Response of Oriented and Highly Anisotropic Subwavelength Metallic Nanostructure Arrays," Applied Physics Letters, 102:201115-1-201115-5 (May 2013).

Alvine et al., "Optically resonant subwavelength films for tamper-indicating tags and seals," Proc. of SPIE, 9456:94560C-1-7 (May 2015).

Alvine et al., "Subwavelength films for standoff radiation dosimetry." Proc. of SPIE, 9455:945503-1-8 (May 2015).

Alvine et al., "Subwavelength resonant nanostructured films for sensing," Proc. of SPIE, 8725:87252H-1-7 (May 2013).

Arshak et al., "Effect of Radiation on Optical and Electrical Properties of Materials," Advanced Materials and Techniques for Radiation Dosimetry, Artech House Publishers, pp. 91-114 (Jun. 2006).

Arshak et al., "Gamma Radiation Sensing Using ZnO and SnO2 Thick Film Interdigitated Capacitors," International Spring Seminar on Electronics Technology, pp. 483-488 (May 2006).

Arshak et al., "Thin and Thick Films of Metal Oxides and Metal Phthalocyanines as Gamma Radiation Dosimeters," IEEE Trans. Nucl. Sci., 51:2250-2255 (Oct. 2004).

Arshak et al., "Various Structures Based on Nickel Oxide Thick Films as Gamma Radiation Sensors," Sensors, 3:176-186 (Jun. 2003).

Murray et al., "Transition from localized surface plasmon resonance to extended surface plasmon-polariton as metallic nanoparticles merge to form a periodic hole array," Physical Review B, 69:165407-1-7 (Apr. 2004).

Quint et al. "A chemical route to sub-wavelength hole arrays in metallic films," Journal of Materials Chemistry, 19:5906-5908 (Jul. 2009).

Office Action for related EP App. No. 13736685.2, dated Feb. 27, 2020, 5 pages.

(56) References Cited

OTHER PUBLICATIONS

Pawar et al., "Multifunctional Patchy Particles by glancing Angle Deposition," *Langmuir*, 25(16):9057-9063 (Aug. 18, 2009).

* cited by examiner

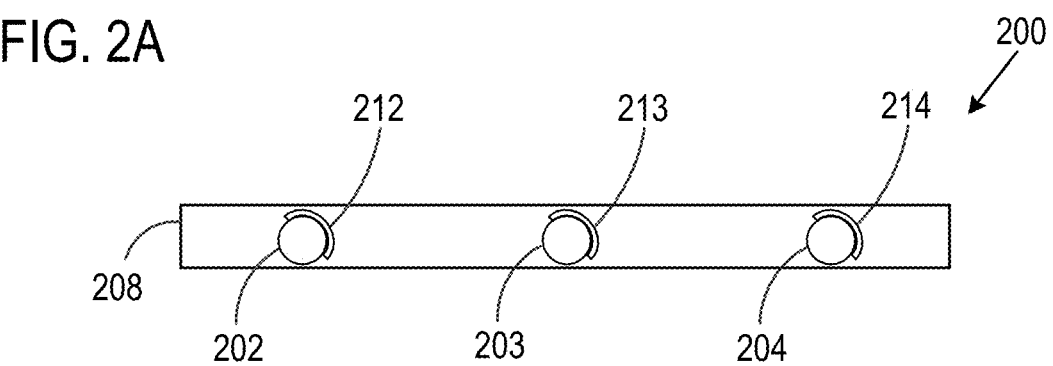
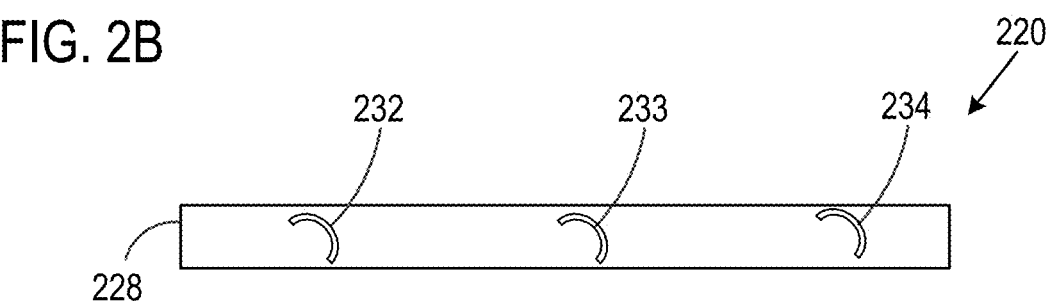
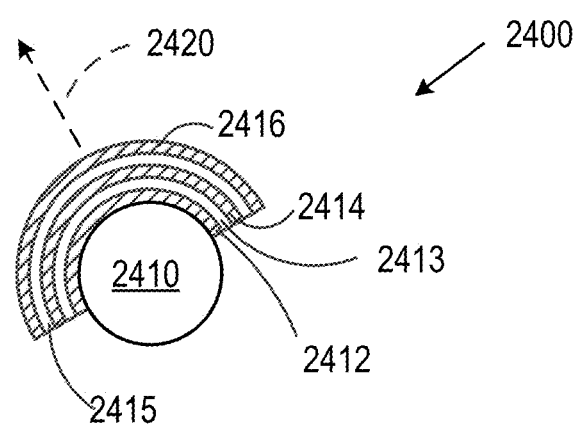

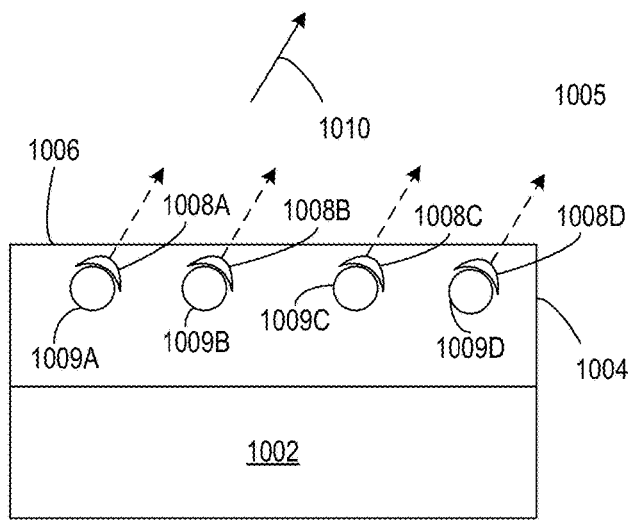
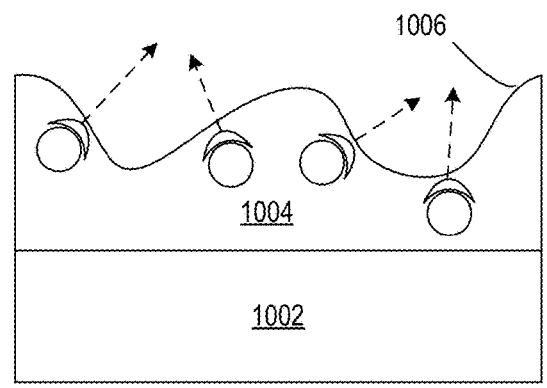
FIG. 10A
FIG. 10B
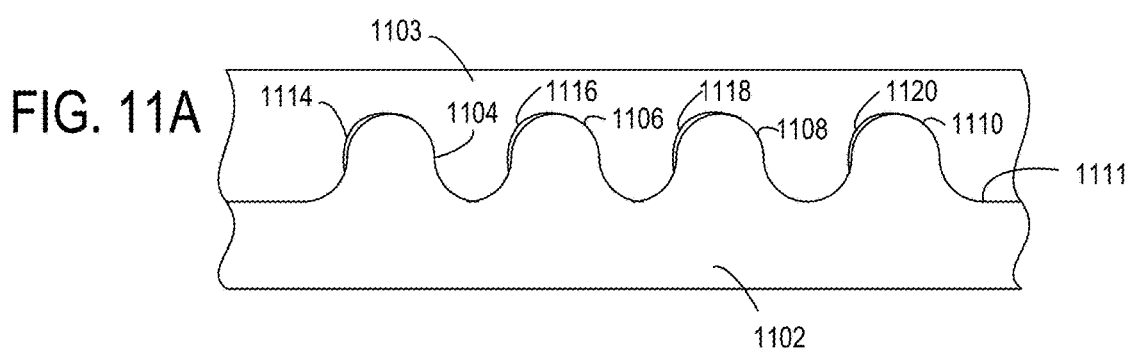
FIG. 11A
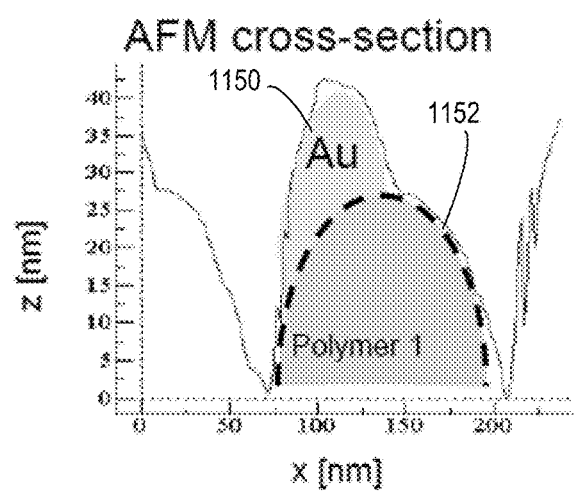
FIG. 11B

TWO DIMENSIONAL META-MATERIAL WINDOWS

CROSS REFERENCE TO RELATED APPLICATION

This application claims the benefit of U.S. Provisional Application 61/662,275, filed Jun. 20, 2012, which is incorporated herein by reference.

ACKNOWLEDGMENT OF GOVERNMENT SUPPORT

This invention was made with government support under DE-ACO5-76RL01830 awarded by the U.S. Department of Energy. The government has certain rights in the invention.

FIELD

The disclosure pertains to metameric materials for optical windows.

BACKGROUND

Conventional windows for residential and commercial construction must permit entry of visible radiation to provide pleasing illumination. In order to avoid heat loss through windows, dual glass panes are spaced apart and the space between filled with an inert gas. This construction reduces heat transfer through the window. Some windows also include so-called low emissivity coatings that reflect infrared radiant so that infrared radiation is not efficiently coupled through the window. Windows using inert gas insulation and low emissivity coatings are superior to single pane windows without coatings. Unfortunately, such windows cannot direct visible or infrared radiation into a building so as to be useful, but instead merely reflect or transmit radiation. For example, visible radiation directed to a conventional window may enter a building at inconvenient angles so that light shades are needed to block entry and avoid glare. Thus, useful visible radiation is wasted, increasing building operating cost and demand for artificial lighting. In addition, while infrared reflecting, low emissivity coatings promote thermal efficiency in some situations, such coatings cannot admit or reject entry of infrared radiation based on interior or exterior temperatures. Thus, infrared radiation that could be admitted to warm interior spaces is rejected. Disclosed herein are windows and methods of making windows that can redirect radiation so as to avoid these and other deficiencies of conventional inert gas based windows.

SUMMARY

Windows include a substrate having first and second major surfaces, and a plurality of nano-radiators coupled to the substrate and oriented along an axis. In some examples, the plurality of nano-radiators is secured to the first major surface or situated between the first and second major surfaces. The nano-radiators can be defined as conductive shells situated in recesses in the substrate, wherein the recesses have circular, polygonal, elliptical, oval, or other cross-sections. The recess can extend from the first major surface to the second major surface, and the conductive shells can extend in the recesses from the first major surface to the second major surface. In some examples, the substrate is a flexible substrate such as an elastomer or polymer layer. In representative examples, the conductive shells include a surface corresponding to a portion of a sphere, cylinder, pyramid, or cube. Conductive shells can be conveniently defined as conductive layers situated on protrusions at the first major surface. The protrusions can be periodic or aperiodic, such as, for example, periodic surface ridges. Nano-radiators are made of conductors such as gold, silver, aluminum or other metals. In some embodiments, the nano-radiators are coupled to the substrate so as to be selectively alignable in response to an extension or compression of the substrate. In typical examples, the substrate includes a first layer and a second layer having different coefficients of thermal expansion and configured so that a thermal expansion of the first layer produces buckling of the second layer, and further wherein the plurality of nano-radiators is coupled to the second layer. In some examples, the nano-radiators are coupled to the second layer so as to be substantially aligned upon thermal expansion of the first layer.

In alternative embodiments, windows include a radiation directing layer comprising a plurality of conductive nanoshells, and at least one transmissive layer. The radiation directing layer and the at least one transmissive layer are situated so that radiation incident in a first direction is directed so as to propagate along a second direction different from the first layer based on an orientation direction of the conductive nanoshells. In typical examples, the radiation direction layer includes a plurality of templates, and the conductive nanoshells are situated on respective templates. In further examples, the plurality of templates includes templates of at least two sizes and configured so that radiation incident in the first direction in a first wavelength range is directed so as to propagate along the second direction and radiation incident in the first direction in a second wavelength range is directed so as to propagate along a third direction different from the second direction. In other examples, the conductive nanoshells are associated with first and second orientation directions. In still other examples, the plurality of templates is situated within the radiation direction layer or at a surface of the radiation directing layer. According to some examples, the transmissive layer and the radiation direction layer have different coefficients of thermal expansion and are configured so that the radiation directing layer is buckled at a first temperature and unbuckled at a second temperature, wherein the first temperature and the second temperature are between 0° C. and 100° C., or between 10° C. and 50° C. In typical embodiments, the nanoshells are configured to be substantially unaligned when the radiation directing layer is buckled so that radiation incident in the first direction propagates through the window without redirection to the second direction. In other alternatives, the radiation directing layer is situated between the first and second glass layers. In one example, the radiation directing layer is situated between first and second glass windows and configured so that visible radiation incident in the first direction is directed so as to propagate along the second direction and through the first and second glass windows, and infrared radiation is reflected. In additional embodiments, the radiation directing layer is configured to transmit incident visible radiation along the second axis and reflect incident infrared radiation along a third axis that is different from the first and second axes. In other embodiments, the plurality of templates includes templates of at least two sizes and configured so that radiation incident in the first direction in a first wavelength range is directed so as to propagate along the second direction and radiation incident in the first direction in a second wavelength range is directed so as to propagate along a third direction different from the second direction.

Methods comprise providing a plurality of nanostructures, and directionally depositing a conductor to portions of the nanostructures. In some examples, methods comprise arranging at least one template at a substrate and directionally depositing a conductor on the least one template so as that the conductor is deposited on a portion of the template surface. In further examples, the at least one template is formed in the substrate as periodic or aperiodic indentations or ridges at or near a surface of the substrate. In typical examples, the at least one template includes a plurality of nanospheres, and a template dimension is reduced prior to directionally depositing the conductor by etching or other process. In additional examples, an encapsulating layer is applied to at least one of the conductor deposited on the template, the at least one template, or the surface of the substrate. The encapsulating layer and the substrate are separated so that at least the conductor deposited on the template is secured to the encapsulating layer. In still further examples, the encapsulating layer and the substrate are separated so that the conductor deposited on the template and the at least one template remain secured to the encapsulating layer. Any conductor deposited on the substrate remains at the substrate. According to some examples, the conductor is deposited on the least one template at two different angles. In still other alternatives, at least the deposited conductor is secured to a first layer that is situated on a second layer, wherein the first and second layers have different coefficients of thermal expansion so that at at least one temperature the first layer is buckled so as to alter an alignment of the deposited conductor. In a particular example, the first and second layers are secured to each other at a temperature elevated with respect to standard room temperature of between 15° C. and 30° C. so that upon cooling to a standard room temperature, the first layer is buckled. In some examples, stiff polymer or metallic layers are used.

These and other features and aspects of the disclosed technology are further described below with reference to the accompanying drawings.

BRIEF DESCRIPTION OF THE DRAWINGS

FIG. 2A illustrates conductive nanoshells and associated templates embedded in a substrate.

FIG. 2B illustrates conductive nanoshells embedded in a substrate without the associated templates.

FIGS. 10A-10B illustrate nanoshells situated with respect to an unbuckled surface and a buckled surface, respectively.

FIG. 11A illustrates nanoshells situated on cylindrical ridges embossed into a substrate and capped with an index matching layer.

FIG. 11B is a representative cross section of a nanoshell and a cylindrical ridge such as shown schematically in FIG. 11A.

FIG. 24 illustrates a nanoshell comprising alternating conductor/dielectric layers formed on a spherical template.

DETAILED DESCRIPTION

Figure 1:
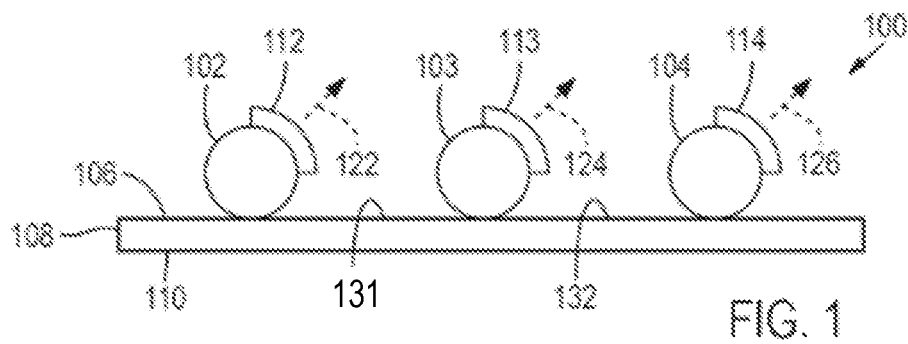
FIG. 1 is a cross-sectional diagram of a representative window that includes conductive nanoshells formed on spherical nanoparticle templates that are situated on a substrate surface.

As used in this application and in the claims, the singular forms "a," "an," and "the" include the plural forms unless the context clearly dictates otherwise. Additionally, the term "includes" means "comprises."

The described systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods which function in the manner described by such theories of operation.

In the disclosed examples, nanoscale conductors are configured to provide wavelength dependent redirection of incident radiation to selected angles. Examples are described with reference to redirection of visible and infrared radiation for application to windows for residential, commercial, and other buildings. Nanoscale conductor elements typically have at least one dimension in a plane that is approximately perpendicular to a propagation direction of incident radiation that is selected based on radiation wavelength. In some examples, nanoscale conductor elements have a nanoscale dimension in one dimension and a much large extent in another. For example, nanoscale conductor elements can be formed as conductive shells on grooves or ridges on non-conductive substrates, or conductive shells on nonconductive rods or tubes. For visible and infrared applications, suitable nanoscale dimensions are in a range of from about 25 nm to 1 μm, 50 nm to about 750 nm, or 100 nm to about 500 nm. Nanoscale conductor thickness can be less than about 500 nm, 100 nm, 50 nm, or 25 nm. For radiation at longer or shorter wavelengths, nanoscale dimensions are generally larger or smaller, respectively. Thicknesses can be selected based conductor absorption coefficient at a particular wavelength or wavelength range.

Substrates for use with radiation directing layers that contain arrangements of nanoshell conductors can be rigid, stiff, flexible, relatively thick or thin, have curved or flat surfaces, and be transmissive or reflective to optical radiation in visible, infrared, or other wavelength ranges. Example substrates include polymers, elastomers, glasses, or other materials. Radiation directing layers can be formed on or secured to other rigid or flexible layers that can be curved or flat. In addition to materials listed above, conductors such as metals can be used.

Formation of suitable nanoscale conductor elements can be done conveniently with directional conductor deposition on nanoscale templates. Such processes and the associated nanoscale conductor elements are described below, but other processes and nanoscale conductor element shapes can be used. Template dimensions are typically between about 1 nm and 1 μm, 2 nm and 500 nm, or 5 nm and 300 nm.

The disclosed optical materials can be referred to as metamaterials. Such materials are based on periodic or other arrangements of individual elements made of suitable conductive materials, such as metals. Optical properties of such materials are based on the elements and their arrangements, and not merely their composition. Element size, shape, orientation, and composition can be used to redirect radiation in one or more wavelength bands as preferred. Element size along at least one direction is typically substantially less than a wavelength of radiation with which a metamaterial is to be used.

Representative Meta-Material Windows and Light Redirecting Layers

With reference to the sectional view of FIG. 1, a representative radiation redirecting layer 100 includes a plurality of nano-spheres 102, 103, 104 situated at a first major surface 106 of a substrate 108. A second major surface 110 of the substrate 108 and the first major surface 106 are parallel. In some examples, the first major surface 106 and the second major surface 108 are locally parallel but curved so that the substrate can be a spherical shell, a cylindrical shell, or other shape. In addition, in still other examples, nano-spheres such as the nano-spheres 102, 103, 104 can be coupled to a curved other surface such as a surface of sphere, cylinder, or a polygonal solid, and parallel major surfaces are not required. In implementations directed to windows for buildings, form factors similar to conventional window glass are preferred, such as thin sheets with parallel major surfaces. In the example of FIG. 1, nanoconductor shells are formed on spherical templates, but in other examples, other surface protrusions such as cylindrical posts or surface depressions such as cylindrical wells can be used. Some representative examples are illustrated below.

Partial conductive shells 112, 113, 114 are provided on respective nano-spheres 102, 103, 104 and are aligned along respective axes 122, 123, 124, 126. In the example of FIG. 1, the partial conductive shells 112, 113, 114 are approximately symmetric about the axes 122, 123, 124, 126 that are substantially parallel. In other examples, conductive shells are aligned along a plurality of different directions. Substrate areas between nano-spheres such as areas 130, 132 are generally non-conductive, and any conductive material used to form the shells 102, 103, 104 is absent. Only three nano-spheres are shown in FIG. 1, but fewer or more (and typically many more) can be used. The partial conductive shells 112, 113, 114 are generally provided by directional deposition of a conductor, such as by directional sputtering of gold. The nano-spheres 102, 103, 104 can be unevenly or evenly spaced, such as randomly spaced or arranged in one or two dimensional arrays. The nano-spheres 102, 103, 104 are generally situated to be shadowed by adjacent nano-spheres based on a direction of deposition and alignment direction of conductive shells. This shadowing is illustrated in more detail in FIG. 19 below. The optical redirecting properties of nanoshells are reduced, impaired, or eliminated if conductive nanoshells are part of a continuous conductor layer that extends to a substrate and then to an adjacent nanoshell.

As shown in FIG. 2A, an alternative layer configuration 200 includes partial conductive shells 212, 213, 214 provided on respective nano-spheres 202, 203, 204 and embedded or partially embedded in a substrate 208. In still other examples such as shown in FIG. 2B, a radiation redirecting layer 228 includes partial conductive shells 232-234 having surfaces defined by, for example, nano-spheres, but any nano-spheres used in construction are removed. Typically, the partial conductive shells tend to be somewhat hemispherical in shape, and the shapes shown in FIG. 2A are for convenient illustration. Quarter-spheres, half and quarter cylinders, and other shapes can also be used.

Figures 3, 4, 5:
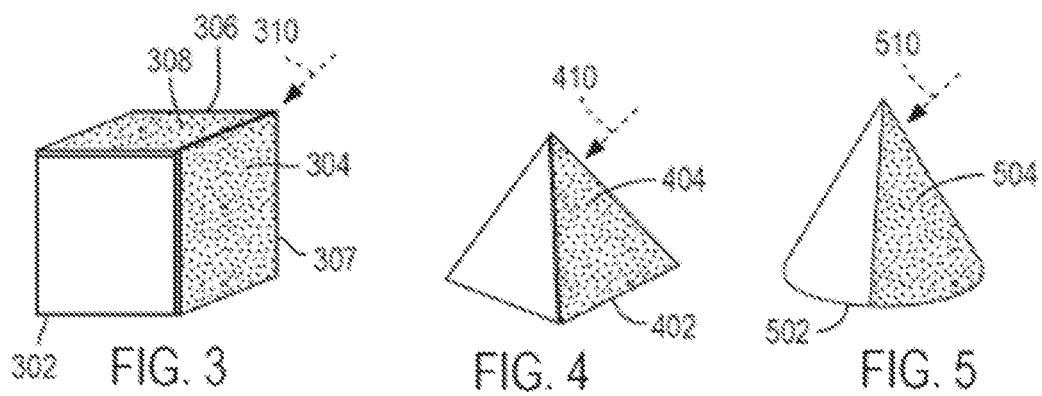
FIG. 3 illustrates a representative conductive nanoshell formed on a cubic template.
FIG. 4 illustrates a representative conductive nanoshell formed on a pyramidal template.
FIG. 5 illustrates a representative conductive nanoshell formed on a conical template.

In the examples of FIGS. 1-2B, partial conductive shells are provided based on conductive coatings applied to selected surface portions of nano-spheres. In other examples, conductive shells have surfaces corresponding to portions of cylindrical, polygonal, pyramidal or other surfaces. Representative examples are illustrated in FIGS. 3-7. As shown in FIG. 3, a nano-cube 302 includes a conductive layer 304 situated on cube faces 306, 307, 308. The conductive layer 304 is associated with an axis 310 which can correspond to an axis along which conductive material is directed to the nano-cube 302 so as to form the conductive layer 304. FIG. 4 illustrates a conductive layer 404 defined by surfaces of a pyramid 402 associated with an axis 410. FIG. 5 illustrates a conductive layer 504 defined by a conical surface of a nano-cone 502 associated with a conductor deposition axis 510.

Figures 6, 7:
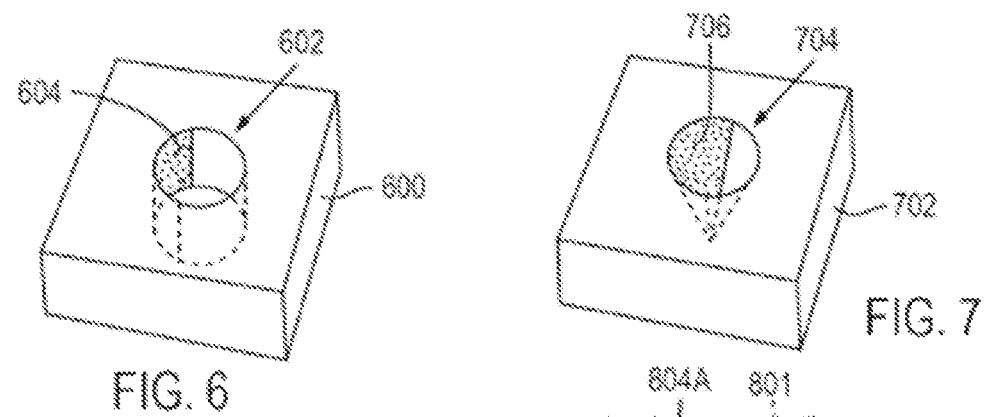
FIG. 6 illustrates a representative conductive nanoshell formed in a cylindrical hole or well.
FIG. 7 illustrates a representative conductive nanoshell formed in a conical hole or well.

Conductors can also be configured based on nano-cavities or concave surface features such as surface indentations or depressions. FIG. 6 illustrates a cylindrical recess 602 that is defined in a substrate 600. A conformal conductor layer 604 is situated so as to cover a portion of a wall of the cylindrical recess 602. The cylindrical recess 602 is shown in FIG. 6 as extending through the substrate 600, but in other examples such recesses can extend only partially through a substrate and form cylindrical wells. Recesses or wells having cross-sections other than circular such as rectangular, ovoid, elliptical, polygonal can be used as well. FIG. 7 illustrates a conical recess 704 defined in a substrate 702 and having a conductive layer 706 situated so as to cover a portion of an interior surface of the conical recess. The conical recess 704 is shown as extending through the substrate 702. In other examples, a conical recess extends only partially through a substrate, or is configured so as to provide a tapered recess directed toward a conical vertex external to a substrate. Tapered recesses can have other cross-sections as well such as rectangular, ovoid, elliptical, or polygonal, and taper configurations other than linear tapers such as associated with cones can be used.

Figure 8:
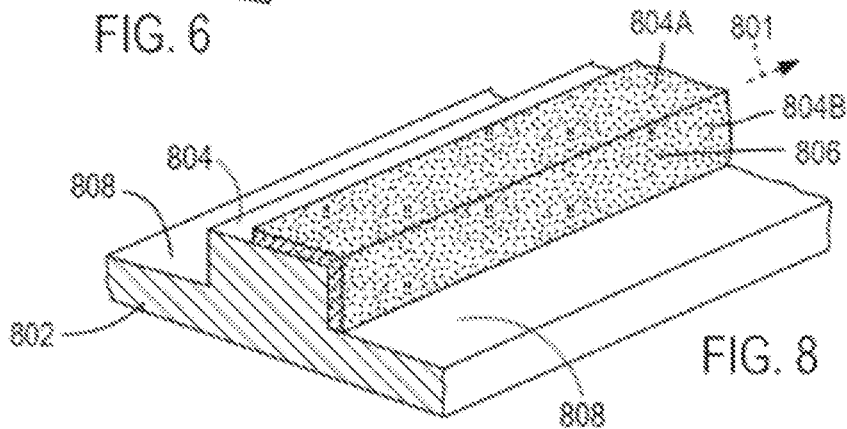
FIG. 8 illustrates a representative conductive nanoshell formed along a ridge.

Yet another example structure is shown in FIG. 8. A substrate 802 includes a ridge 804 that extends parallel to an axis 801. A metallic or other conductive coating 806 is applied to ridge surfaces 804A, 804B while a substrate surface 808 adjacent the ridge 804 is substantially free of any metallic or other conductive coating. FIG. 8 illustrates a single ridge 804, but a plurality of ridges can be provided, and such ridges can be randomly, irregularly, periodically or otherwise spaced. In other examples, one or more curved ridges or trenches are used, or sets of ridges or trenches are arranged to extend along one or more different axes.

Multilayer structures can be constructed as shown in FIG. 24. A multilayer assembly 2400 includes conductive layers 2412, 2414, 2416 with interleaved dielectric layers 2413, 2415. A template 2410 is used to define layer shapes, and all layers are defined with respect to an axis 2420. Each of the layers 2412-2416 can have the same or different thicknesses, and different or the same dielectrics and conductors can be selected for each layer. Fewer or more layers can be provided, and some layers can be defined with respect to different axes.

Figure 25:
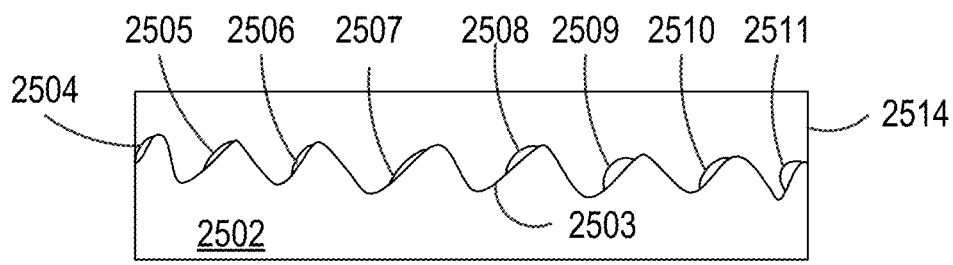
FIG. 25 illustrates conductive shells situated on a roughened surface.

In another alternative, a glass or other substrate layer can be roughened by mechanical, chemical, or laser ablation, or etching processes. Surface features formed in this manner can be directionally coated at relatively oblique angles to form conductive nanoshells. Light scattering due to surface roughening can be reduced by applying an index matching layer. Referring to FIG. 25, a substrate 2502 has a roughened surface 2503 defining a plurality of peaks and valleys. Directional conductive shells 2504-2511 are defined by directional deposition onto surface peaks, and an index matching layer 2514 covers the conductive shells 2504-251 and remaining uncoated portions of the surface 2503. Features of the surface 2503 can be arranged regularly or irregularly based on how the surface 253 is produced. As shown in FIG. 25, all surface peaks/valleys need not have the same dimensions, but it is generally preferably that peak height and separation permit shadowing in directional deposition. Conductive shells formed on such a substrate can be used in dynamic windows as discussed below, and/or can be lifted off the substrate 2502 and retained in an additional support layer.

Dynamic Meta-Material Windows and Light Redirecting Layers

Figure 9A:
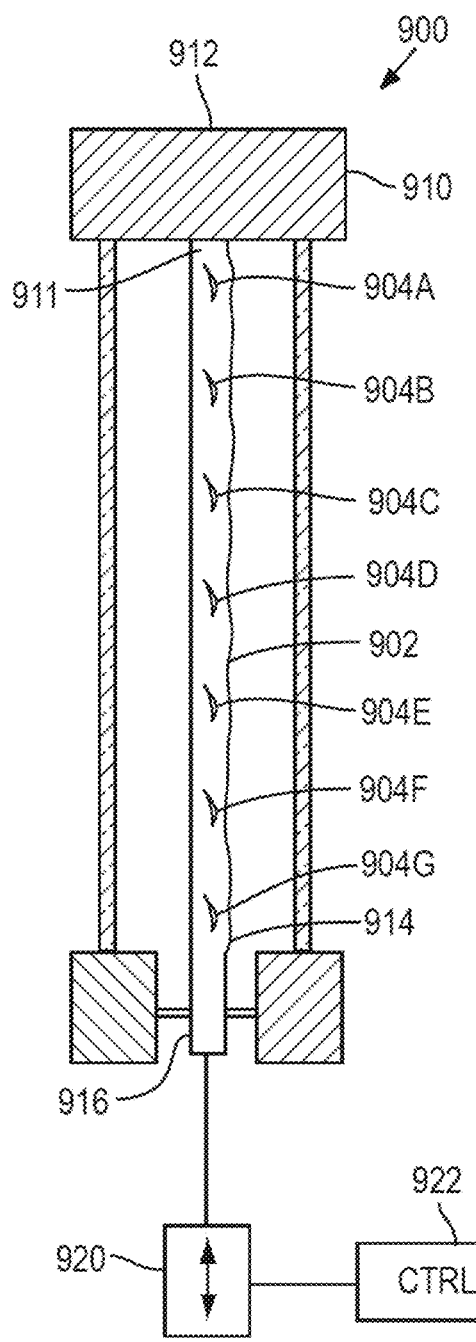
FIGS. 9A-9C illustrate a building window that includes a layer that re-orients conductive nanoshells in response to thermally induced buckling.

Nanoshells or other radiation directing nanostructures can be configured to be re-orientable so that incident radiation can be redirected (or not) along one or more different angles. With reference to FIG. 9A, a window 900 includes a substrate 902 that includes a plurality of oriented, conductive nanoshells such as nanoshells 904A-904G. The substrate 902 is configured to have at least one buckled (or bucklable) surface 914 and the nanoshells 904A-904G are coupled to the buckled surface 914. A first end 911 of the substrate 902 is secured to a top frame 912, and a second end 916 is secured to a movable bottom frame 920. The bottom frame 920 is coupled to or includes a translation mechanism that is configured to stretch the substrate 902 as directed by a controller 922.

Figure 9B:
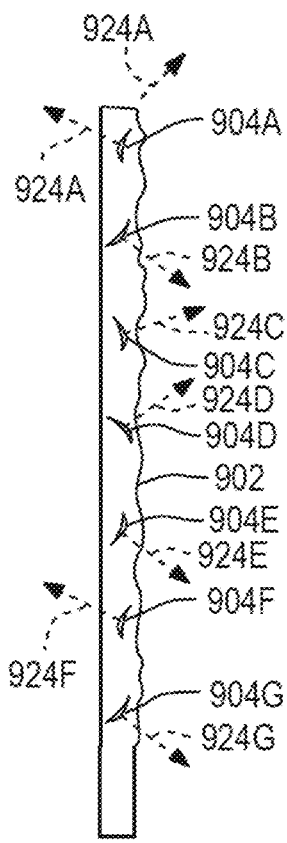
Figure 9C:
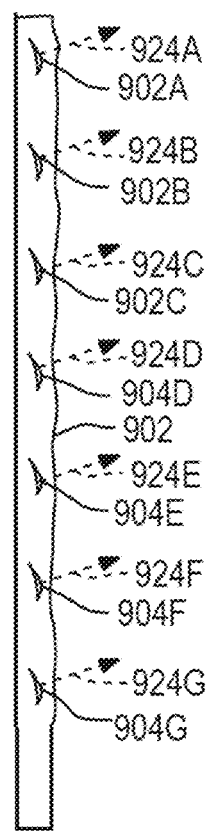

FIGS. 9B-9C illustrate the substrate 902 of FIG. 9A in unstretched and stretched configurations, respectively. In FIG. 9B, the nanoshells 904A-904G are disposed in various orientations, i.e., nanoshell axes 924A-924G are generally not parallel to each other, and the buckling of the surface 914 is apparent. In the stretched configuration of FIG. 9C, buckling of the surface 914 is reduced, and the axes 924A-924G tend to be similarly oriented. In the configuration of FIG. 9C, the nanoshells 924A-924G tend to direct an incident light flux based on the approximately common nanoshell orientation and a radiation angle of incidence.

The controller 922 can be arranged to be activated by user (such as a room occupant) or be coupled to a timer or other sensor so that the window 900 is controlled based on solar position with respect to the window. In addition, current weather conditions can also be used so as to, for example, selectively reject infra-red radiation when outdoor temperatures are relatively high and admit infra-red radiation when outdoor temperatures are relatively low. Control can also be based on desired room illumination instead of or in addition to infra-red radiation control.

For many applications, external control of nanoshell orientation such as provided in FIGS. 9A-9C is overly complex and expensive. A passively switched layer for use in a window is illustrated in FIGS. 10A-10B. A first substrate 1002 and a second substrate 1004 are bonded together, typically at an elevated temperature. The first substrate has a lower coefficient of thermal expansion (CTE) than the second substrate. For example, the first substrate can be glass having a CTE of $8.5*10^{-6}/°$ C. and the second substrate can be a polymer substrate having a CTE of about $70*10^{-6}/°$ C. Upon cooling from the elevated temperature, a surface 1006 of the second substrate 1004 is buckled as shown in FIG. 10B.

A plurality of oriented nanoshells 1008A-1008D situated on respective templates 1009A-1009D (shown in FIGS.

10A-10B as nanospheres) are retained in, on, or otherwise by the second substrate 1004 such that the orientation of the nanoshells is dependent on local orientation of the surface 1006 of the second substrate 1004. For example, the nanoshells 1008A-1008D are generally oriented relatively parallel to an axis 1010 at a warmer temperature as shown in FIG. 10A, and generally lack substantial orientation at a cooler temperature at which the surface 1006 is buckled as shown in FIG. 10B.

Nanoshell size, shape, and orientation can be selected so that radiation at selected wavelengths is transmitted through the layers 1002, 1004 and propagates along a selected axis. For example, silver nanoshells can be situated in an elastomer layer so that infrared radiation incident to the elastomer layer is directed into a building if the elastomer is buckled and the nanoshells unaligned. If the elastomer layer is buckled, the silver nanoshells are situated so that infrared radiation is reflected. In some cases, one or more layers of nanoshells, and/or nanoshells of different sizes, shapes, orientations, and compositions can be used in different layers or a common layer. Nanoshells can be provided with or without associated templates, and one or more wavelength bands can be selected, and nanoshells configured to transmit or reflect along corresponding axes. For applications in which infrared radiation is to be redirected, nanoshell dimensions of 100 nm to 200 nm are typically preferred.

Surface buckling is generally provided by combining at least one stiff film or other stiff layer such as a metal or stiff polymer layer and a relatively soft supporting layer, typically an elastomer or a polymer. This softer film can be thicker than the stiff film. For example, metal on elastomer on glass, or polymer on elastomer on glass can be used. Compressive stress causes the thin stiff film to buckle, which will disrupt the ordering of the nanoshells in the elastomer near the elastomer/thin film interface. As noted above, compressive stress can be produced with a CTE mismatch or mechanically.

Referring to FIG. 11A, an imprinted substrate 1102 includes a plurality of imprinted features 1104, 1106, 1108, 1110 that are provided with conductive nanoshells 1114, 1116, 1118, 1120, respectively. A protective or refractive index matching layer 1103 is situated so as to fill the imprinted features and cover the nanoshells 1114, 1116, 1118, 1120. As shown in FIG. 11A, the imprinted features 1104, 1106, 1108, 1110 are one dimensional sinusoidal curves of surface 1111 of the imprinted substrate 1102. In other examples, spherical or other protrusions or wells can be imprinted and provided with anistropically situated conductive shells.

FIG. 11B illustrates a cross-section of a conductive nanoshell 1150 situated on an imprinted feature similar to those of FIG. 11A. A conductive gold layer of thickness of up to about 25-30 nm partially covers one side of a polymer protrusion 1152 that is about 125 nm wide.

Figure 12A:
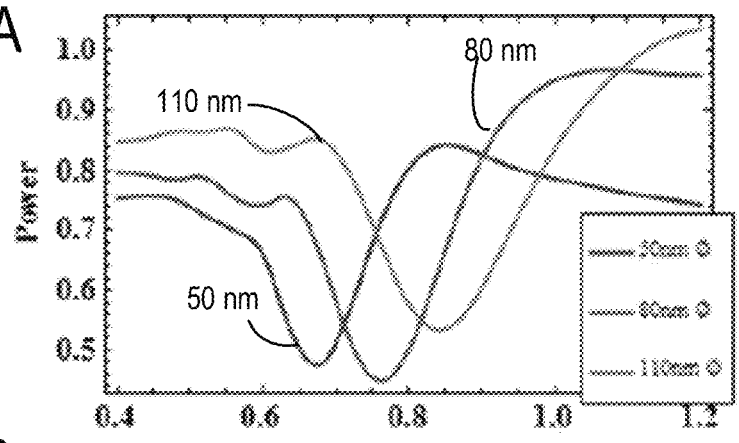
FIGS. 12A-12C illustrate calculated relative redirected power as a function of nanoshell width, nanoshell thickness for gold nanoshells, and nanoshell conductor materials (gold, silver, aluminum), respectively.
Figure 12B:
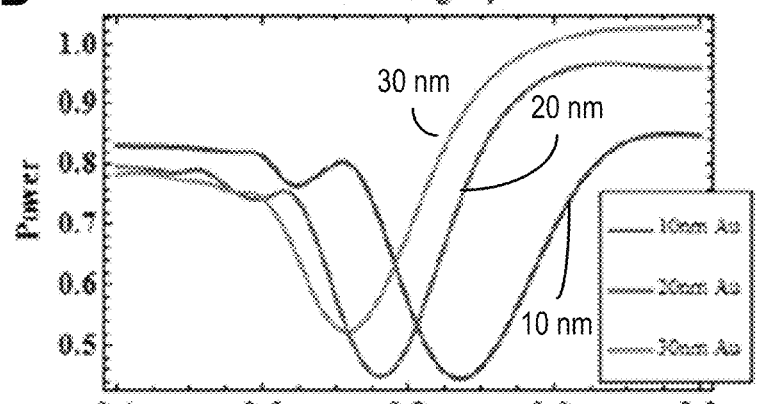
Figure 12C:
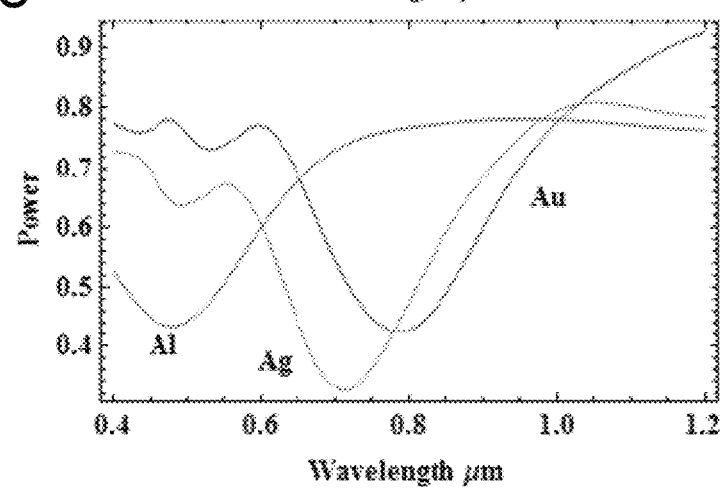

FIGS. 12A-12C illustrate calculated relative redirected power as a function of nanoshell width, nanoshell thickness for gold nanoshells, and nanoshell conductor materials (gold, silver, aluminum), respectively.

Additional Examples

Figure 13:
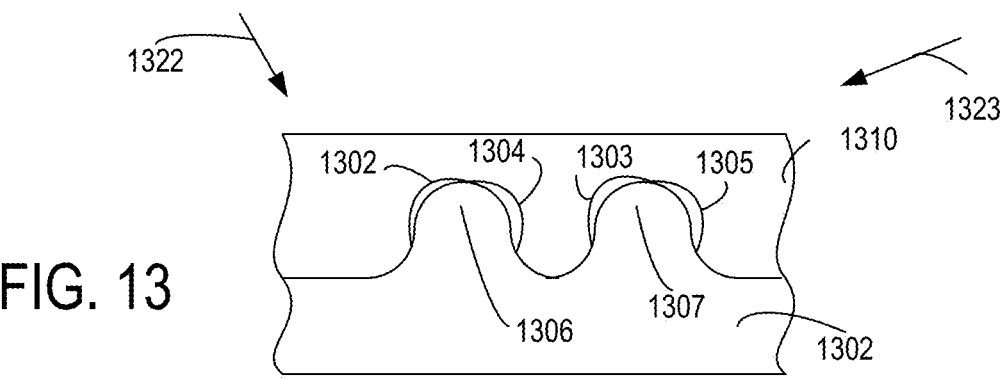
FIG. 13 illustrates different nanoshells situated on different portions of cylindrical ridges embossed into a substrate and capped with an index matching layer.

In another example shown in FIG. 13, nanoshells 1302, 1304 and 1303, 1305 are situated on respective protrusions 1306, 1307 having widths and heights ranging from about 10 nm to about 500 nm. The protrusions extend from a substrate 1302 and are the nanoshells 1302-1305 and the protrusions 1306-1307 are capped with an index matching layer 1310. The nanoshells 1302, 1304 can be different or the same in size, shape, composition, or thickness from the nanoshells 1303, 1305. The nanoshells 1302, 1304 and 1303, 1305 are formed by directional sputtering along axes 1322, 1323, respectively. In yet another example shown in FIG. 14, nanoshells 1402, 1404 are situated on respective rectangular protrusions 1406, 1408 in a substrate 1402. The protrusions 1406, 1408 typically have widths and heights ranging from about 10 nm to about 500 nm, and can be capped with an index matching layer 1410.

Protrusions, depressions, or other templates for nanoshell formation can be produced using nano-imprint lithography (NIL) in which patterns are replicated on polymer materials by stamping and thermal embossing or ultraviolet curing, but other methods can be used. Nanoshells can be formed by directional sputtering onto the template structures. Templates for NIL can be formed by, for example, spin coating polymer films such as 4.2% by mass solutions of polystyrene with molecular weight 97,000 g/mole and a polydisperity index of 1.05 dispersed in toluene on precleaned fused silica. Templates can be formed by imprinting with a hard silicon mold having rectangular cross section lines via thermal embossing. In a representative example, the rectangular lines have a pitch of 137 nm, a duty cycle of 1, and a line height 50 nm. Molds can be pre-cleaned and treated with a fluorinated silane vapor to facilitate mold release. Line-space patterns are directionally sputter coated with, for example, about 25 nm of gold or other conductor at a suitable sputter angle such as 60 degrees, measured from a surface normal and transverse to the lines. Sputtering angle and template dimensions are selected to avoid formation of a continuous conductor film. A protective, index-matching layer of poly(dimethylsiloxane) (PDMS) or other index matching layer can be applied to the sputter coated line-space patterns.

Figure 14:
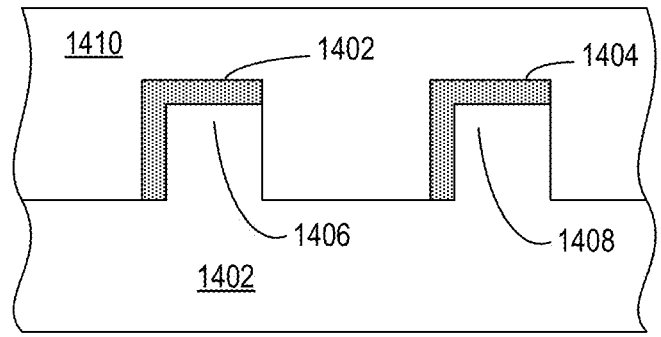
FIG. 14 illustrates a direction of deposition for forming nanoshells on periodic rectangular ridges.
Figure 15:
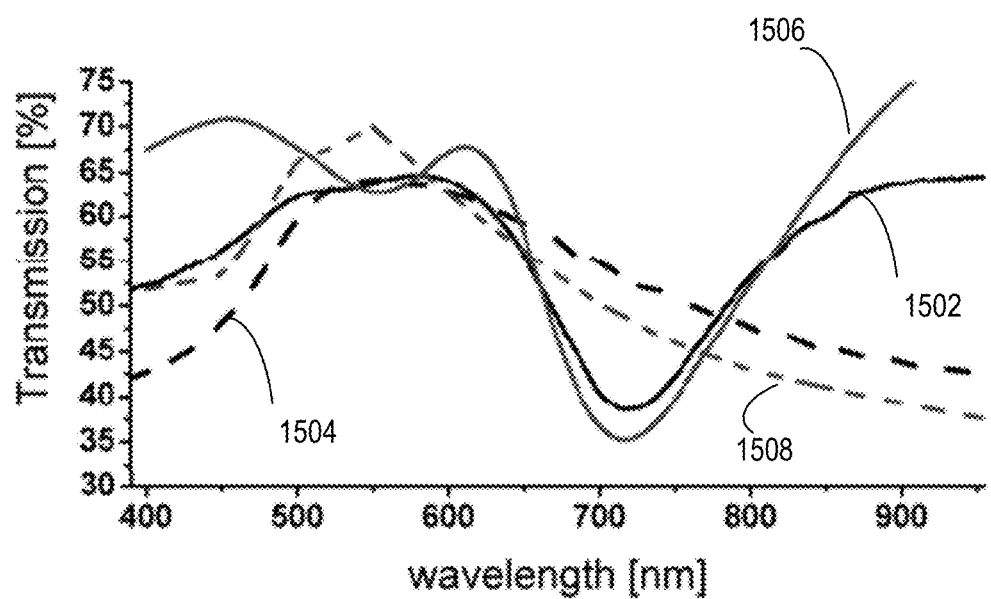
FIG. 15 shows representative transmission data from a structure such as that of FIG. 14 as a function of wavelength with unpolarized light at normal incidence.
Figure 16:
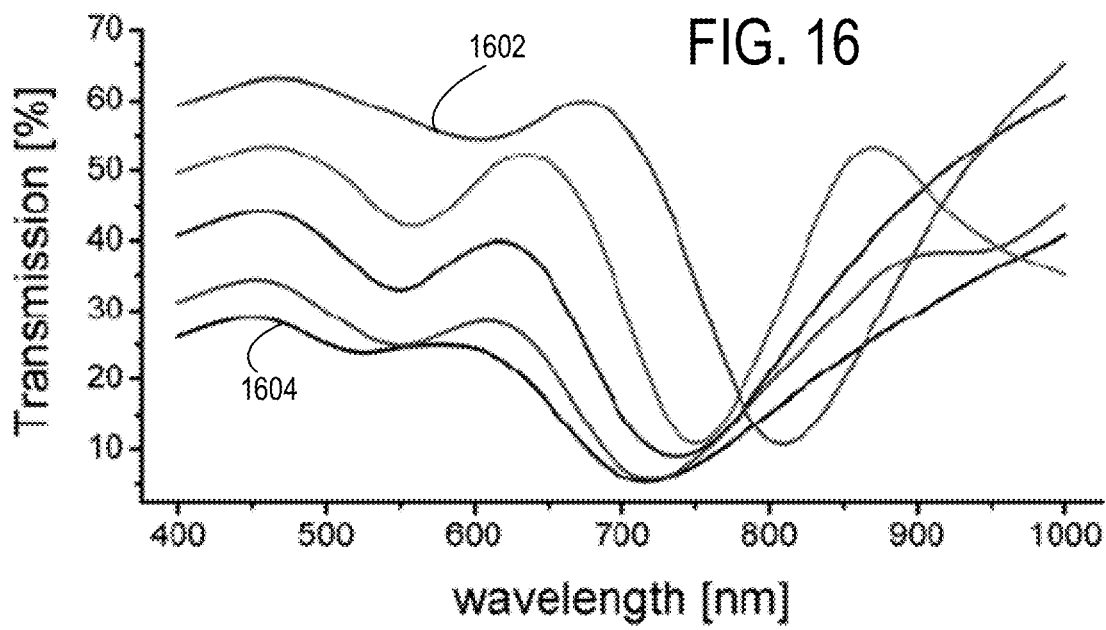
FIG. 16 shows calculated transmission spectra as a function of wavelength for conductor thicknesses from 15 nm to 35 nm in 5 nm increments for a structure such as that of FIG. 15 illustrating that increased conductor thickness is associated with shifts to shorter wavelengths.

FIG. 15 shows representative transmission data (curve 1502) from a structure such as that of FIG. 14 as a function of wavelength with unpolarized light at normal incidence. A transmission spectrum from a non-patterned area of the same substrate (curve 1504) is shown for comparison. Modeling data with an applied constant offset is also shown for a patterned substrate area (curve 1506) and a non-patterned area (curve 1508). A wavelength associated with a transmission minimum can be selected based on conductive coating thickness. For a gold coating, transmission spectra as a function of wavelength for conductor thicknesses from 15 nm (curve 1602) to 35 nm (curve 1604) in 5 nm increments are shown in FIG. 16. Increased thickness is associated with shifts to shorter wavelengths.

Figure 17:
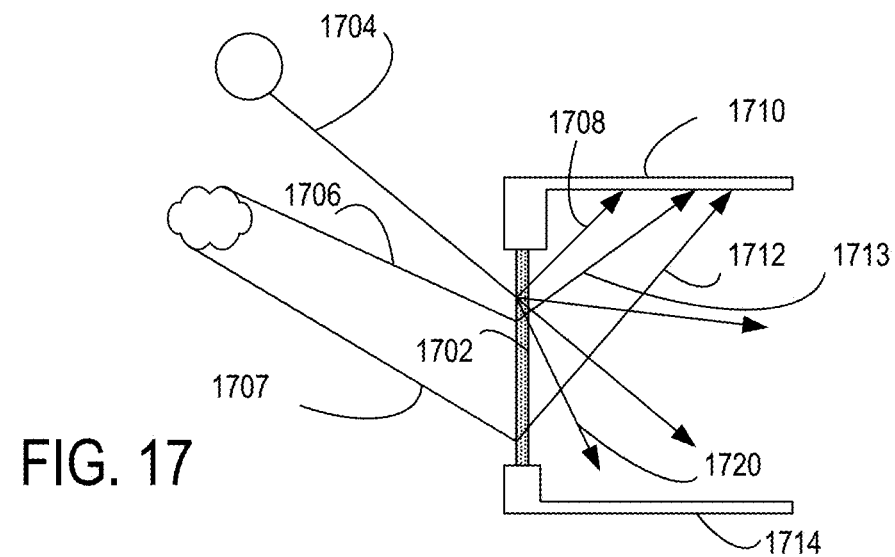
FIG. 17 illustrates a portion of a building that includes a radiation directing window.

Referring to FIG. 17, a window 1702 that includes a layer having a plurality of oriented nanoshells is situated so as to receive direct sunlight along an axis 1704 and diffuse light along axes 1706, 1707. The window 1702 directs direct light along an axis 1708 to a ceiling 1710 and diffuse light along axes 1712, 1713 to the ceiling 1710. In the absence of orientated nanoshells, both direct and diffuse radiation would follow the axes 1704, 1706, 1708 to a floor 1714. In other examples, diffuse or direct light is directed along other directions, and some wavelength ranges can be reflected by the window 1702 while others are transmitted at one or more different angles. For example, infrared radiation can be reflected while visible radiation directed to the ceiling 1710, or a portion of either direct or diffuse light can be made to propagate along an axis 1720 to the floor 1714.

While windows and nanoshells for use with visible wavelengths are particularly important for architectural applications, radiation in other wavelength ranges can be similarly selectively reflected and/or transmitted, and substrates, elastomers, and other materials can be selected for use with other wavelengths. For example, substrates such as silicon, germanium, gallium arsenide, glass, fused silica, polymers, plastics, and other crystalline and non-crystalline materials can be used. Nanoshells can be formed by directional conductor deposition of a metal such as gold or silver, or other conductive material. Nanoshell dimensions can be determined based on desired optical properties. In some cases, nanoshells extend along linear axes, such as nanoshells that use ridge-shaped templates. For such extended nanoshell features, radiation polarized along the nanoline length is generally not associated with optical resonances associated with the nanoshells, and different polarizations can accordingly be differently directed.

Representative Fabrication Methods

Figure 18:
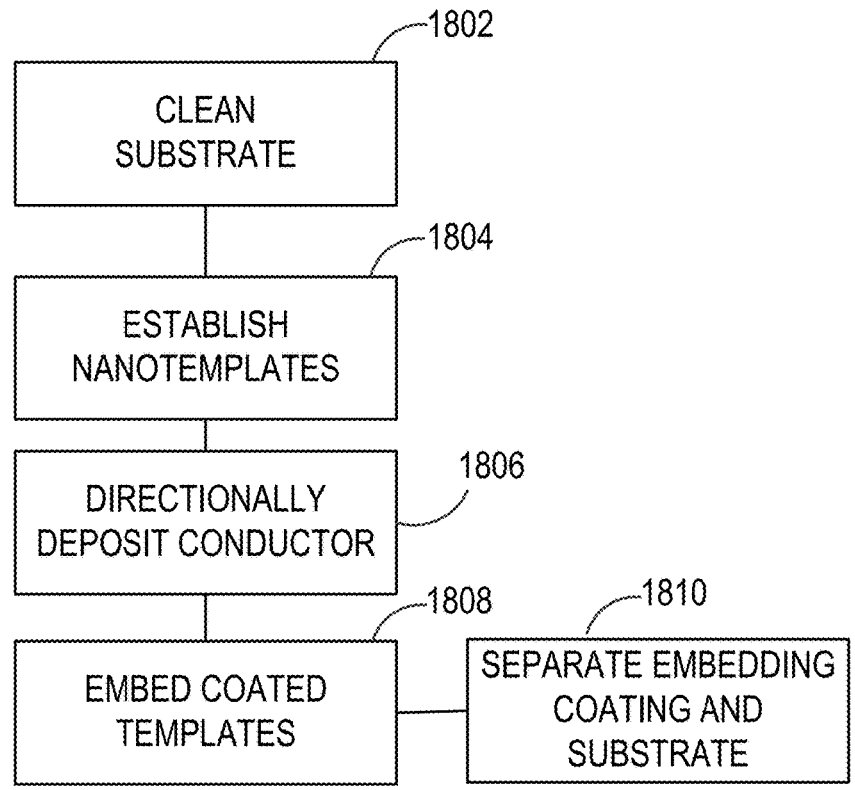
FIG. 18 is a block diagram of a representative method of making a directional radiation layer.

Referring to FIG. 18, a representative method includes cleaning a substrate at 1802 and establishing nanotemplates at 1804. Substrates can be selected so as to be sacrificial or non-sacrificial. A sacrificial substrate is generally chosen for simple removal from the nanotemplates by etching or other process. Silicon is a convenient example of a sacrificial substrate. Other suitable substrates include glasses, fused silica, or plastics. For many applications, non-sacrificial substrates are preferably optically transmissive. However, for applications in which radiation redirection does not require transmission, non-transmissive substrates can be used. In some examples, nanotemplates are established by application of nanoparticles such as nanospheres, nanowires, nanotubes, nanocubes, nanorods, or other nanoscale structures to a substrate surface. For example, polystyrene nanospheres can be used, but templates of other materials such as other polymers, metal oxides, or ceramic oxides such as silica can be used. Generally a single layer of such templates is used, but multiple layers can be used, and templates of different sizes, shapes, and orientations can be used in one layer or different layers can include different templates and combinations thereof.

Templates are spaced apart to avoid formation of a continuous conductor layer. In one method, a densely packed layer of templates is formed on a substrate, and the template layer is then etched so that the templates are spaced apart. Etching can be done with reactive ion etching (RIE), oxygen or argon etches, or wet etches. In another approach, template structures such as nanoparticles are expanded by swelling with a liquid, so that the nanoparticle size can be reduced on a substrate surface by driving out the liquid. In yet another approach, the templates can be electrically charged so as to be spaced apart. Alternatively, templates can be overcoated with removable coating. After dispersal on a substrate surface such the templates are densely packed, the overcoating can be removed so that the templates are spaced apart.

In other examples, nanoscale embossing or printing is to provide a polymer film, a curable resin, or sol-gel precursor with template features. Patterns such line/space gratings can be used, or arrangements of posts, spheres, or other shapes can be used. In addition, grid patterns can be used. In some examples, templates of a single shape, size, or orientation are used, but combinations of shapes, sizes, and orientations can be used. Template height variations can be used to provide selected optical properties at a plurality of wavelength ranges. As discussed above, templates can be formed as either depressions or voids in a substrate instead of or in addition to templates that extend outwardly from a substrate. In other methods, dewetting of films such as polymer films can be used to produce polymer islands that can serve as templates. Templates can also be formed by low pressure sputtering, or based on nanodroplets produced by spraying. In yet another approach, block copolymers can be used to produce template features using films based on covalently bonded polymers that exhibit phase separation when solidifying. Template features such as spheres, cylinders, or other features can be produced, and swelling and/or etching can be used to provide suitable feature size and spacing.

At 1806, a conductor material is directionally deposited on the nanotemplates. A variety of metallic or other conductors can be used. Al, and Ag may be appropriate for use in redirecting radiation at short visible wavelengths, and Au and Ag may be appropriate for use in the infrared. Other metals such as Pt, Ni, Cr, Cu, and Pd can be used. Magnetron sputtering can be used to deposit a metal at a selected angle between 0 and 90 degrees relative to a surface normal by mounting the sample at an angle or by tilting a sputter target. Collimation may or may not be needed to ensure high directionality. To ensure high conductivity, the sample is generally heated slightly and a high sputter rate is used. Directional deposition can also be done based on evaporation. In some cases, a dielectric coating is applied to the conductor shortly after deposition to prevent or reduce oxidization of metallic conductors. Because some applications require coating of large areas (such as for residential windows), a sample to be coated is secured to a linear translation stage and moved with respect to multiple sputter heads, wherein the sputter heads are situated so as to coat respective areas. Alternatively, a substrate is rotated with a sputter target rotating and tilting in an appropriate fashion to keep a common sputtering direction across the substrate (if desired). In addition, the orientation of nanoshells can be varied based on translations and rotation so one more or both of a substrate and a sputter target.

Figure 19:
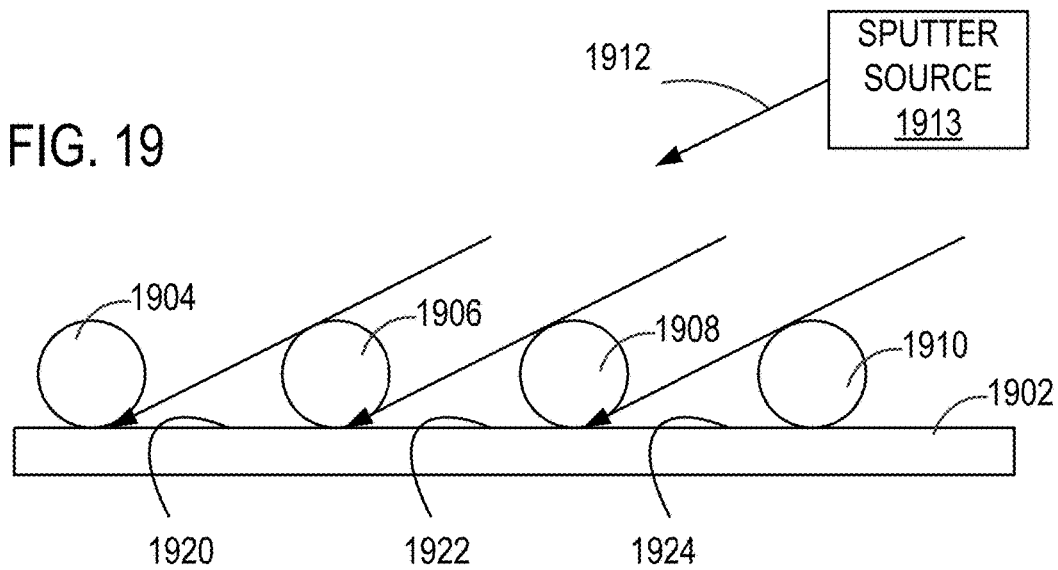
FIG. 19 illustrates template placement and deposition direction to avoid inter template conductor deposition.

Conductor deposition is generally configured so that suitable templates are partially coated, and surfaces between templates are uncoated. Referring to FIG. 19, nanospheres 1904, 1906, 1908, 1910 are situated at a surface 1903 of a substrate 1902. A conductive coating is applied from a sputtering source 1913 along an axis 1912 so that inter-template areas 1920, 1922, 1924 are shadowed or partially shadowed by corresponding templates so that the inter-template areas 1920, 1922, 1924 remain uncoated.

While a substrate can be used upon conductor deposition, in some cases some inter-template areas receive conductor, and the conductor portions in inter-template areas are removed prior to use. For example, referring again to FIG. 18, conductor coated nanotemplates are embedded in an elastomer or other layer at 1808. Typically, conductor portions situated in inter-template areas adhere to the substrate, and the coated templates can be removed along with the elastomer layer at 1810. In some examples, the nanotemplates are removed by etching or other process. In still further examples, the elastomeric layer with embedded, coated nanotemplates (or nanoshells only) is bonded to a support layer at an elevated temperature so that when cooled, the elastomeric layer is buckled.

Directional sputtering, evaporation, or other coating processes can be used to form nanoshells or other orientable conductive nanostructures, but other processes such as etching of metallic nanoparticles or incorporation of nanoparticles into diblock polymer structures are suitable.

Figure 20:
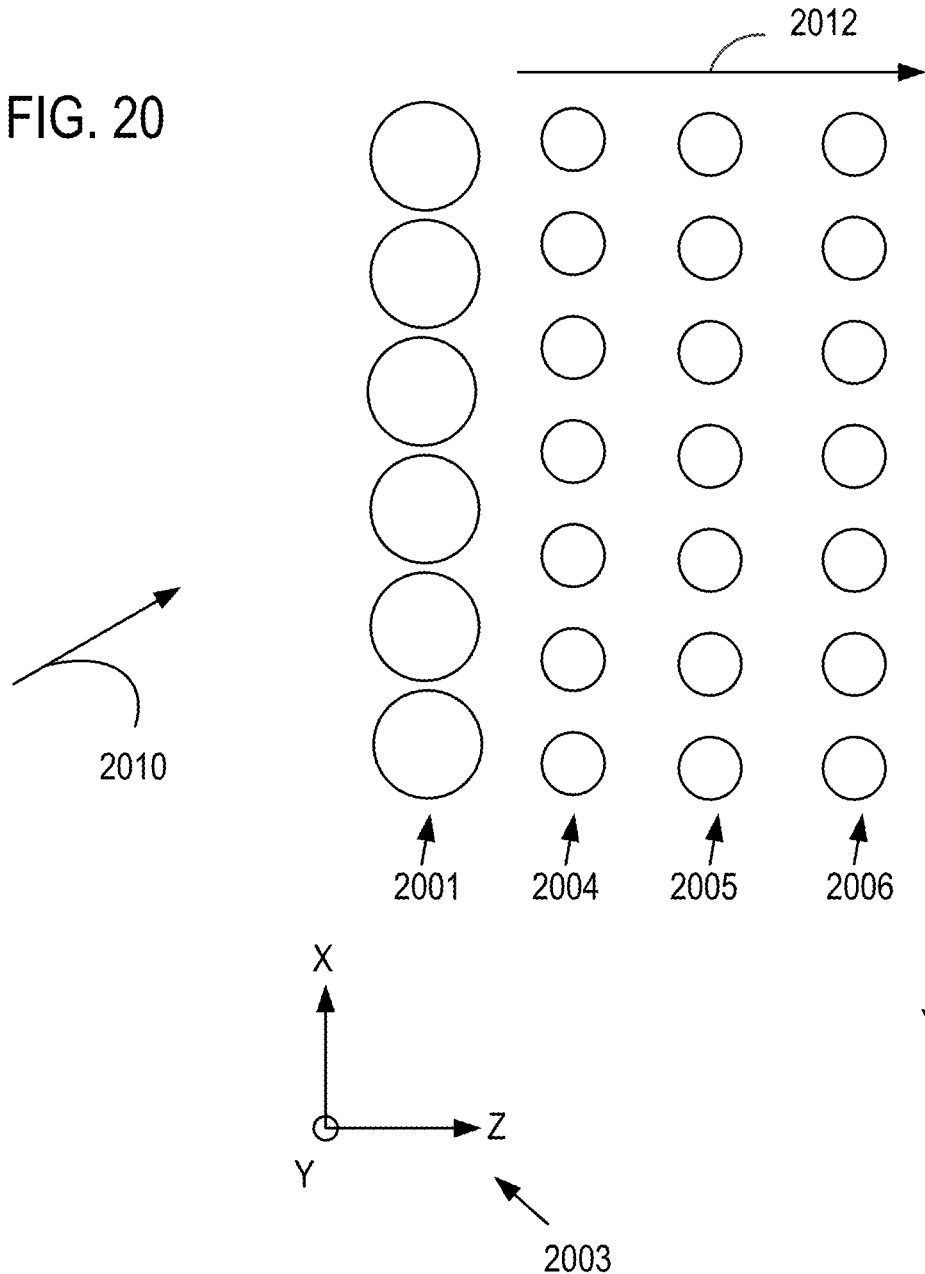
FIG. 20 illustrates a directional antenna based conductive nanoshells.

While the disclosed methods and apparatus are particularly applicable to windows for buildings, radiation directing materials can be used for other applications as well. With reference to FIG. 20, a radiation redirector 2000 is situated to receive an input radiation flux along an axis 2010 and direct the flux along an axis 2012. The redirector 2000 includes arrays 2001, 2004, 2005, 2006 of nanoshells that are arranged in planes parallel to an XY plane of a coordinate system 2003. Nanoshells of each of the rows can be oriented independently, as desired. Array spacings can be based on radiation wavelength such as approximately ¼ or ½ wavelength, or other values. For example, one or more of the arrays 2001, 2004, 2005, 2006 can be spaced in a Yagi-Uda antenna configuration as so-called directors or reflectors. In such configurations, array spacings are based on radiation wavelength, and are typically somewhat different than ¼ and ½ wavelength. One or more of the arrays 2001, 2004, 2005, 2006 can be electrically or mechanically switchable as discussed above.

Representative Redirection Performance

The efficiency of a radiation redirector can be quantified with a Figure of Merit (FOM) that corresponds to a ratio of redirected radiation in a selected direction to total redirected radiation. For most applications, FOM values of at least 0.2, 0.3, 0.4, 0.5, 0.6, or 0.7 are preferred over a spectral range. For example, for window applications, FOM values of at least 0.3 over a visible radiation bandwidth are preferred.

Figure 21:
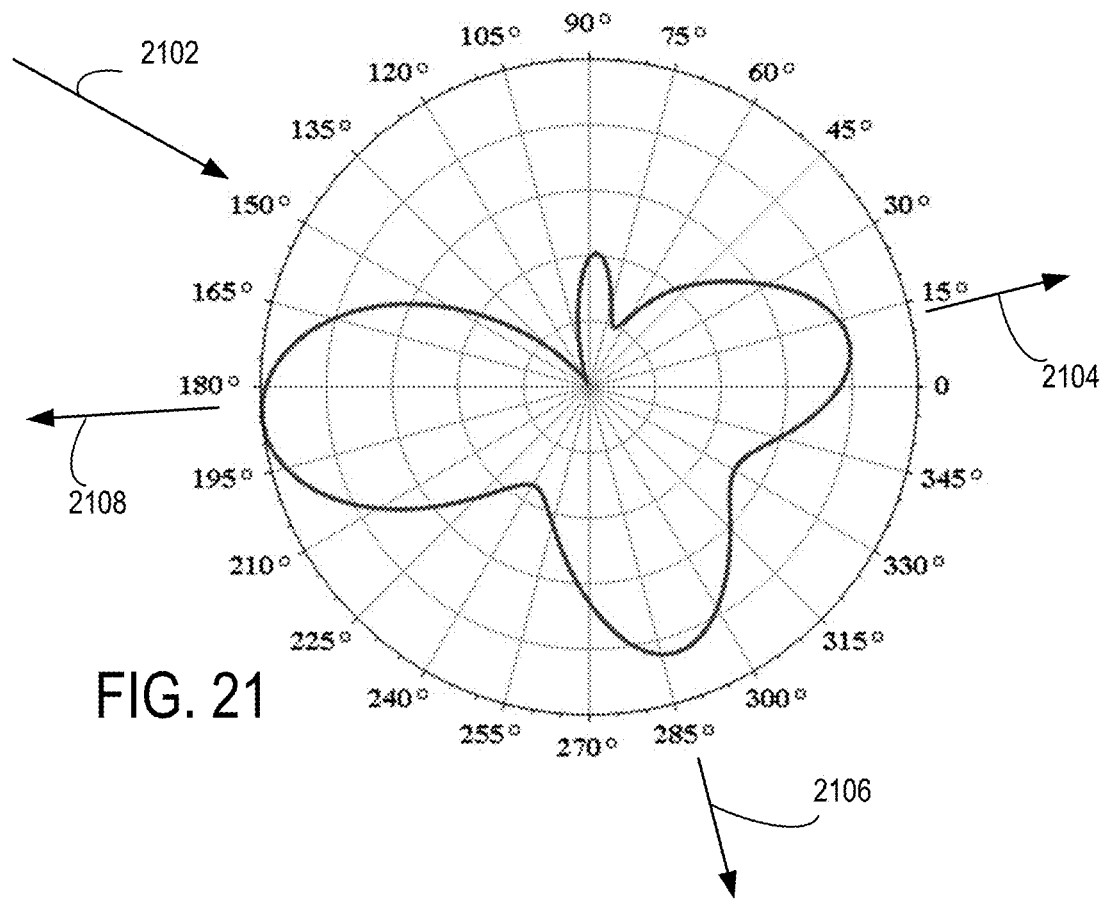
FIG. 21 illustrates a calculated radiation pattern illustrating radiation redirection associated with an oriented layer of conductive nanoshells.

Radiation redirection is further illustrated in FIG. 21. Radiation input along an axis 2102 is transmitted along axes 2104, 2106 and reflected along an axis 2108. As shown in FIG. 21, the axis 2102 corresponds to an angle of incidence of about 30 degrees.

Multilayer Structures

Figure 22:
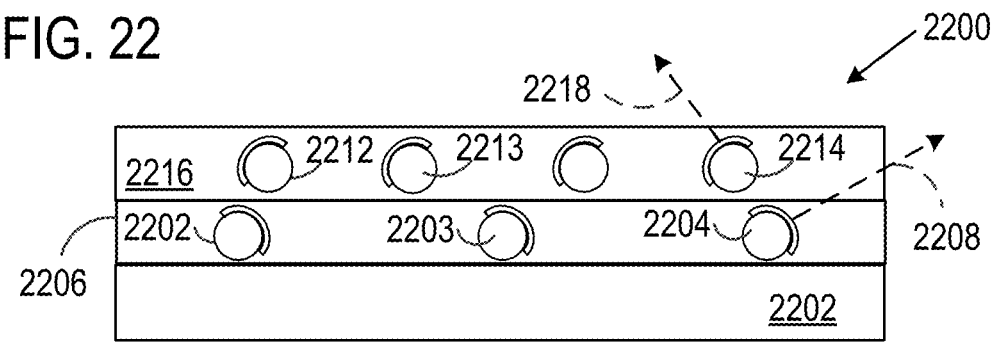
FIG. 22 illustrates a multilayer assembly of conductive nanoshells.

Referring to FIG. 22, a multilayer light redirecting assembly 2200 includes a first set of partially conductively coated templates 2202, 2203, 2204 situated on a substrate 2202 and aligned along an axis 2208. A layer 2206 is provided to encapsulate the coated templates 2202, 2203, 2204. A second set of partially conductively coated templates 2212, 2213, 2214 aligned along an axis 2218 is encapsulated by a layer 2216. The axes 2208, 2218 can be parallel or non-parallel, and conductive shells can be provided with or without templates. Layer by layer encapsulation can be convenient but is not necessary. Differing template shapes, sizes, materials, and spacings and differing conductive shell shapes, sizes, and materials can be used in one or more layers. A substrate is not necessary, and such multilayer structured can be rigid or flexible, and thermally induced buckling can be provided in one or more layers.

Figure 23:
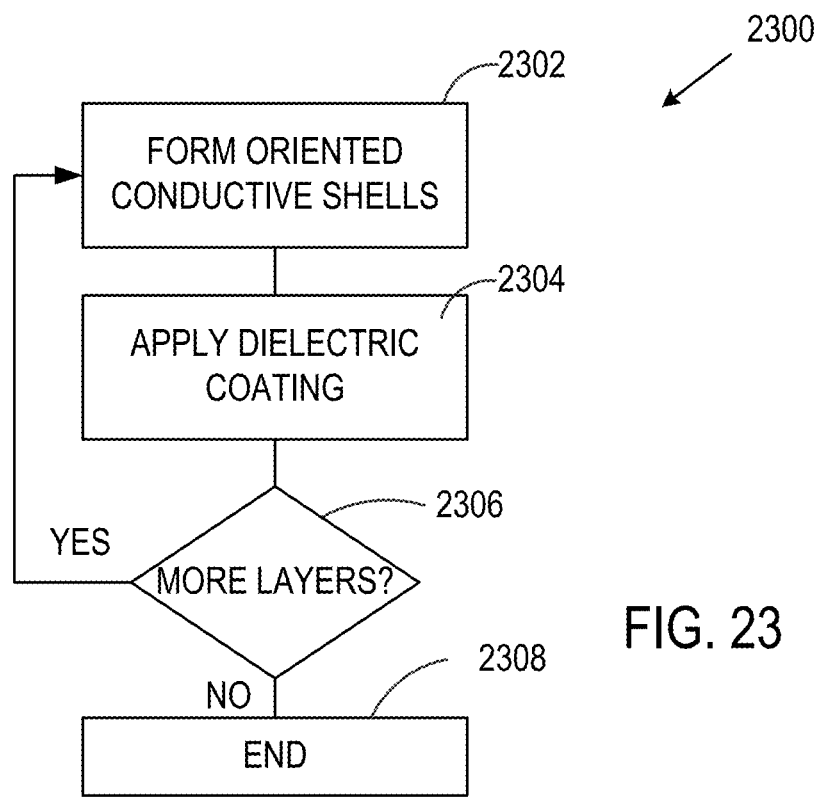
FIG. 23 illustrates a representative method of forming multilayer assemblies of conductive nanoshells.

FIG. 23 illustrates a method 2300 for forming multilayer stacks of conductive shells. At 2302, oriented conductive shells are formed. At 2304, a transparent dielectric coating such as $SiO_2$, a polymer, or other dielectric materials is deposited on the conductive shells. At 2306, it is determined if more conductive shells are desired. If so, additional oriented conductive shells are formed at 2302. Otherwise, shell formation stops at 2306.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An optical device, comprising:
a substrate having first and second major surfaces; and
a plurality of nano-radiators each comprising a conductive shell situated on a template that is coupled to the substrate, the plurality of nano-radiators oriented along respective parallel axes, each parallel axis passing through a midpoint of the conductive shell situated on the respective nano-radiator, each of the nano-radiators separated by a shadow region free of a conductive coating having a length based on the orientation direction of the parallel axes and a height dimension of an adjacent nano-radiator;
wherein the substrate includes a first layer and a second layer having different coefficients of thermal expansion and configured so that a thermal expansion of the first layer produces buckling of the second layer, and further wherein the plurality of nano-radiators coupled to the second layer of the substrate.

2. The optical device of claim 1, further wherein the templates of the plurality of nano-radiators are secured to the first major surface.

3. The optical device of claim 1, wherein the plurality of nano-radiators is situated between the first and second major surfaces.

4. The optical device of claim 1, wherein the first and second major surfaces are non-planar surfaces.

5. The optical device of claim 1, wherein the substrate is a flexible substrate.

6. The optical device of claim 1, wherein the templates are spheres, cylinders, pyramids, or cubes and the conductive shells include a surface corresponding to a portion of a sphere, cylinder, pyramid, or cube.

7. The optical device of claim 1, wherein the conductive shells have at least two conductive layers separated by at least one dielectric layer, wherein each of the conductive layers is formed of one or more or a combination of gold, silver, aluminum or other metal or metals.

8. The optical device of claim 1, wherein the conductive shells are symmetric conductive shells and the plurality of nano-radiators are oriented to emit along the respective parallel axes.

9. An optical device, comprising:
a substrate having first and second major surfaces; and
a plurality of nano-radiators each comprising a conductive shell situated on a template that is coupled to the substrate, the plurality of nano-radiators oriented along respective parallel axes, each parallel axis passing through a midpoint of the conductive shell situated on the respective nano-radiator, each of the nano-radiators separated by a shadow region free of a conductive coating having a length based on the orientation direction of the parallel axes and a height dimension of an adjacent nano-radiator;
wherein the substrate includes a first layer and a second layer and the nano-radiators are coupled to the second layer so as to be substantially aligned upon thermal expansion of the first layer.

10. An optical device, comprising:
a radiation directing layer comprising a first plurality of conductive nanoshells defined on spherical templates having a first radius and a second plurality of conductive nanoshells defined on spherical templates having a second radius, the first plurality of conductive nanoshells and the second plurality of conductive nanoshells oriented along first parallel axes that extend through a midpoint of the conductive nanoshells of the first plurality of conductive nanoshells, and second parallel axes that extend through a midpoint of the conductive nanoshells of the second plurality of conductive nanoshells respectively; and at least one transmissive layer, wherein the radiation directing layer and the at least one transmissive layer are situated so that radiation incident in a first direction is directed so as to propagate along a second direction different from the first direction based on orientation directions of the first and second parallel axes, wherein each of the conductive nanoshells is situated so as to be adjacent or within a shadow region free of a conductive coating and defined by the orientation direction and a dimension of an adjacent nanoshell;

wherein the transmissive layer and the radiation directing layer have different coefficients of thermal expansion and are configured so that the radiation directing layer is buckled at a first temperature and unbuckled at a second temperature.

11. The optical device of claim 10, wherein the first radius is different than the second radius and the first plurality of conductive nanoshells and the second plurality of conductive nanoshells are situated so that radiation incident in the first direction in a first wavelength range is directed so as to propagate along the second direction and radiation incident in the first direction in a second wavelength range is directed so as to propagate along a third direction different from the second direction.

12. The optical device of claim 10, wherein the spherical templates having the first radius and the second radius are situated within the radiation direction layer.

13. The optical device of claim 10, wherein the spherical templates having the first radius and the second radius are situated at a surface of the radiation direction layer.

14. The optical device of claim 10, wherein the first temperature and the second temperature are between 0° C. and 100° C.

15. The optical device of claim 14, wherein the first temperature and the second temperature are between 10° C. and 50° C.

16. The optical device of claim 10, wherein the first plurality of nanoshells and the second plurality of nanoshells are configured to be substantially unaligned when the radiation directing layer is buckled so that radiation incident in the first direction propagates through the optical device without redirection to the second direction.

17. The optical device of claim 10, wherein the at least one transmissive layer includes first and second glass windows, wherein the radiation directing layer is situated between the first and second glass layers.

18. The optical device of claim 17, wherein the radiation directing layer is configured so that visible radiation incident in the first direction is directed so as to propagate along the second direction and through the first and second glass windows, and infrared reflected.

19. The optical device of claim 10, wherein the radiation directing layer is configured to transmit incident visible radiation along the second direction and reflect incident infrared radiation along a third direction that is different from the first and second directions.

20. The optical device of claim 10, wherein the radiation directing layer is configured to selectively transmit or reflect infrared radiation.

21. The optical device of claim 20, wherein the radiation directing layer is configured to selectively transmit or reflect infrared reflected radiation based on an ambient temperature.

22. The optical device of claim 20, wherein the radiation directing layer is configured to selectively transmit or reflect infrared reflected radiation based on a temperature of the at least one transmissive layer or the radiation directing layer.

23. An optical device, comprising:
a substrate having first and second major surfaces; and
a plurality of nano-radiators defined as conductive shells situated in recesses in the substrate and oriented along respective parallel axes that pass through a midpoint of respective conductive shell, wherein the nano-radiators are separated by insulating regions defined by the substrate, the substrate including a first layer and a second layer having different coefficients of thermal expansion and configured so that a thermal expansion of the first layer produces buckling of the second layer, and further wherein the plurality of nano-radiators is coupled to the second layer so as to be substantially aligned when the first layer is unbuckled and misaligned when the first layer is buckled.

24. The optical device of claim 23, wherein the recesses have circular, polygonal, elliptical, or oval cross-sections.

25. The optical device of claim 24, wherein the recesses extend from the first major surface to the second major surface.

26. The optical device of claim 25, wherein the conductive shells extend in the recesses from the first major surface to the second major surface.

27. An optical device, comprising:
a substrate having first and second major surfaces; and
a plurality of nano-radiators each comprising a conductive shell situated on a template that is coupled to the substrate, the plurality of nano-radiators oriented along respective parallel axes, each parallel axis passing through a midpoint of the conductive shell situated on the respective nano-radiator, each of the nano-radiators separated by a shadow region free of a conductive coating having a length based on the orientation direction of the parallel axes and a height dimension of an adjacent nano-radiator;

wherein the substrate includes a first layer and a second layer having different coefficients of thermal expansion and configured so that a thermal expansion of the first layer and the second layer substantially aligns the nano-radiators.

* * * * *